April 18, 1944.         C. HUTCHINSON                2,347,110
                          MOUSE TRAP
                        Filed June 9, 1941
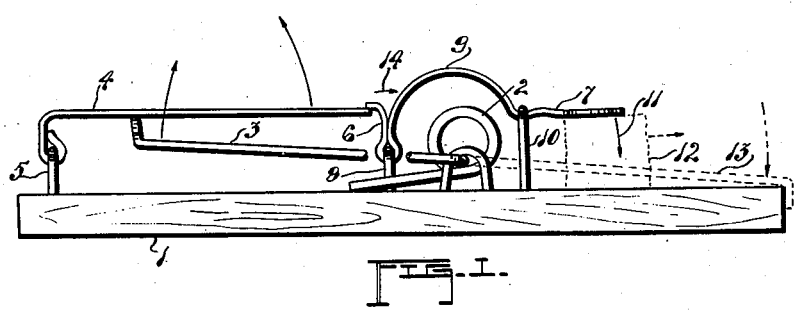
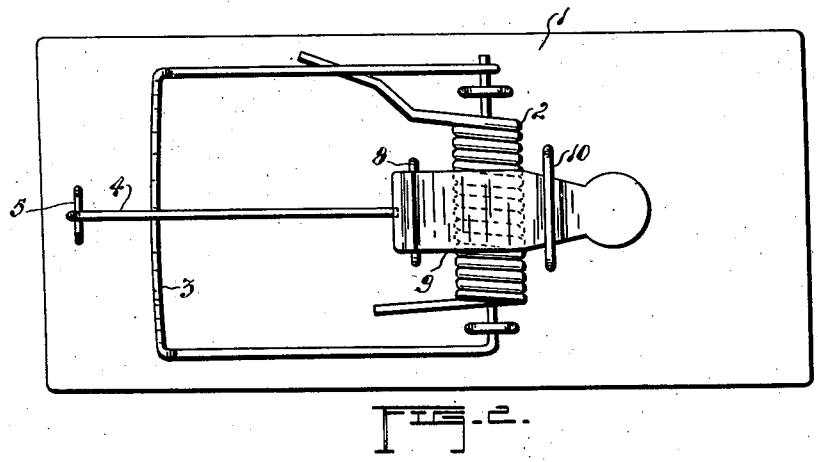
Applicant:
Charles Hutchinson.
Fetherstonhaugh & Co
Atty's.

Patented Apr. 18, 1944

2,347,110

UNITED STATES PATENT OFFICE 2,347,110

MOUSETRAP

Charles Hutchinson, Kamloops, British Columbia, Canada

Application June 9, 1941, Serial No. 397,338

2 Claims. (Cl. 43—81)

My invention relates to improvements in mouse traps, an object thereof being to provide a mouse trap which is to all intents and purposes as simple as the conventional mouse trap and as cheaply made, but which can be more easily set and is not likely to "spring" a number of times before being successfully set.

A further object of my invention is to provide a trap of the character herewithin described which is not liable to "spring" prematurely and yet which will spring without fail when the bait is attacked.

With the above more important objects in view and such other minor objects as may appear as the specification proceeds, my invention consists essentially in the arrangement and construction of parts all as hereinafter more particularly described, reference being had to the accompanying drawing, in which—

Figure 1 is a side view of my trap.

Figure 2 is a plan view of my trap.

In the drawing like characters of reference indicate corresponding parts in the different figures.

The painstaking care with which the conventional mouse trap must be set so that it will not "spring" prematurely after being laid down or "spring" while being set is well known. It is also well known that in the effort to set the trap so that it will not spring prematurely, it is often set so heavily that the mouse can detach the bait without springing the trap.

My trap overcomes the foregoing objections and consists of the conventional mounting board 1, the conventional coil spring 2 extending transversely thereacross and designed to operate the conventional breakback yoke 3 which is held in the set position which I have illustrated by means of the stay-rod 4 freely movable in the conventional eye-bolt 5 projecting upwardly from the upper surface of the mounting board.

Instead of engaging an eye or loop integral with a prong on which a piece of bait is mounted and which comprises the rod release and bait holder respectively of the conventional trap, I provide the novel rod release element 6 and bait holder 7 which are illustrated in the accompanying figures.

From these figures it will be seen that my rod release element and bait holder are formed from sheet-stock and are integral, both being pivoted for vertical rotation upon the down turned U-bracket 8.

It will be seen that my bait holder spans the spring 2 in the form of an arcuate portion 9, the bait holding end being limited in its vertical rotation by the stop 10 which is also in the form of a down turned U-shaped bracket.

When set, the bait holder presses downwardly as indicated by the arrow 11 onto the piece of bait 12 and as soon as the bait is removed, obviously the bait holder will snap down under the influence of the rod 4 which bears upwardly against the underside of the rod release element 6, and the breakback yoke 3 will snap over into the position indicated in chain lines 13 as per conventional practice in the breakback type of trap.

Here I would expain that it is instinctive for mice and other rodents to attempt the removal of the bait so that they can move it about and nibble it how they please. Such removal cannot possibly be effected successfully (that is, without "springing") in the type of trap which I have described herein.

Even if the bait is nibbled to a substantial extent while in situ, the pressure of the bait holder into the bait, will sooner or later cause the rod release element 6 to move sufficiently far in the direction of the arrow 14 to release the breakback yoke 3.

The reason for the stop 10, is of course, to limit the upward movement of the bait holder and because obviously, the higher it rises, the more securely does the rod release element engage the stay-rod 4. In effect therefore, the operation of inserting bait into my trap is essentially a light wedging operation, that is, a wedging of the bait between the mounting board and the bait holder.

Since various modifications can be made in my invention and many apparently widely different embodiments of same made within the scope of the claims without departing from such spirit and scope, it is intended that all matter contained in the accompanying specification shall be interpreted as illustrative only and not in a limiting sense and I desire only such limitations placed thereon as are specifically expressed in the accompanying claims.

What I claim as my invention is:

1. In a mouse trap, and in combination with a conventional mounting board, spring, breakback yoke, setting rod, and rod release element; a bait holder spanning said spring, said rod release element and said bait holder being integral and pivoted for vertical movement about a common point, and a stop for determining the upward limit of movement of said bait holder during the act of inserting a piece of bait between said bait holder and said mounting board said bait holder being so arranged that when it is in engagement with said stop, said release element will be in a position to engage and hold said rod in set position.

2. The device as defined in claim 1 in which said stop is in the form of an inverted U-shaped yoke secured to said mounting board and overspanning said bait holder.

CHARLES HUTCHINSON.